US005099457A

United States Patent [19]

Giannotta et al.

[11] Patent Number: 5,099,457

[45] Date of Patent: Mar. 24, 1992

[54] ACOUSTIC WAVE REFLECTOR CAPABLE OF WORKING UNDER DEEP SUBMERSION

[75] Inventors: Jean-Claude Giannotta, Laurent du Var; Robert Gagno, La Garde; Eric Sernit, Mouans Sartoux, all of France

[73] Assignee: Thomson-CSF, Puteaux, France

[21] Appl. No.: 631,429

[22] Filed: Dec. 21, 1990

[30] Foreign Application Priority Data

Dec. 29, 1989 [FR] France .............................. 89 17432

[51] Int. Cl.$^5$ .............................. H04B 11/00

[52] U.S. Cl. .............................. 367/131

[58] Field of Search .............................. 367/131, 87, 2, 151, 367/172

[56] References Cited

U.S. PATENT DOCUMENTS 2,390,847 12/1945 Olson .............................. 367/172
3,501,741 3/1970 Wallen et al. .............................. 367/172
4,126,847 11/1978 Etkins .............................. 367/131
4,982,386 1/1991 Henriquez .............................. 367/151

FOREIGN PATENT DOCUMENTS 0114764 8/1984 European Pat. Off. .
853978 10/1952 Fed. Rep. of Germany .

*Primary Examiner*—Daniel T. Pihulic
*Attorney, Agent, or Firm*—Oblon, Spivak, McClelland, Maier & Neustadt

[57] ABSTRACT

In an acoustic wave reflector working in the sea, a sheet of air is set up between a reflecting plate and a perforated plate. This sheet of air forms a reflecting interface with the reflecting plate. A rubber bladder forms a container which, under the effect of the pressure of the water, feeds the sheet of air through the perforated plate. The thickness of this sheet of air is kept substantially constant up to the limit of submersion of the reflector. This makes it possible to increase the depth at which the acoustic reflectors are used.

5 Claims, 3 Drawing Sheets

ACOUSTIC WAVE REFLECTOR CAPABLE OF WORKING UNDER DEEP SUBMERSION

BACKGROUND OF THE INVENTION

1. Field of the Invention

The present invention relates to acoustic wave reflectors that work in a liquid environment, generally at sea, and may be subjected to high pressure corresponding to deep immersion.

2. Description of the Prior Art

Most acoustic wave reflectors work by using the reflection that takes place on an interface between the sea environment and another environment in which the speed of the acoustic waves is greatly different from their speed in water.

The ideal method would be to use a very thin plate that is perfectly transparent to acoustic waves and demarcates a volume in which a vacuum has been set up. In practice, metal strips of a certain thickness are used, letting through acoustic waves up to frequencies of the order of some kHz, and a filler gas which is most commonly just air. Naturally, such a device is highly sensitive to pressure, and there can be no question of submerging it to any significant depth.

The French patent No. 2 539 541, filed by the present applicant on Jan. 19, 1983, has proposed the use, instead of air, of a foam formed by a visco-elastic matrix enclosing a large number of gas bubbles. Improved performance values are thus obtained, but these are far from satisfactory.

For, the foam gets quickly crushed owing to the pressure, and the speed of sound increases accordingly therein, so to approach its speed in water. This considerably reduces the reflective power of the device. In practice, it then becomes difficult to exceed a submersion depth of the order of 100 m.

Furthermore, the visco-elastic material is fairly sensitive to temperature, and this also contributes to lowering the performance values of the device.

SUMMARY OF THE INVENTION

To overcome these drawbacks, the invention proposes an acoustic wave reflector, capable of working under deep submersion, that includes a reflecting plate, a perforated plate, means to keep the reflecting plate parallel to the perforated plate without joining them acoustically to each other, and to demarcate a sheet of air between these plates, forming an acoustic reflector with the reflecting plate, means to maintain imperviousness between the two plates on their periphery, and a flexible membrane fixed to the periphery of the perforated plate on the other side from the reflecting plate to form an inflatable cavity communicating with the sheet of air, the stiffness of the means for joining the two plates to each other, as compared with the stiffness of the flexible membrane, being such that, under the external pressure of submersion, the inflatable cavity gets retracted by pushing the air towards the sheet of air without any any substantial reduction taking place in the thickness of this sheet of air.

BRIEF DESCRIPTION OF THE DRAWINGS

Other particular features and advantages of the invention will appear clearly from the following description, given as a non-restrictive example with reference to the appended drawings, of which.

FIGS. *2a* to *2d* show sectional views of the reflector of FIG. 1 subjected to different pressures.

DESCRIPTION OF A PREFERRED EMBODIMENT

Figure 1:
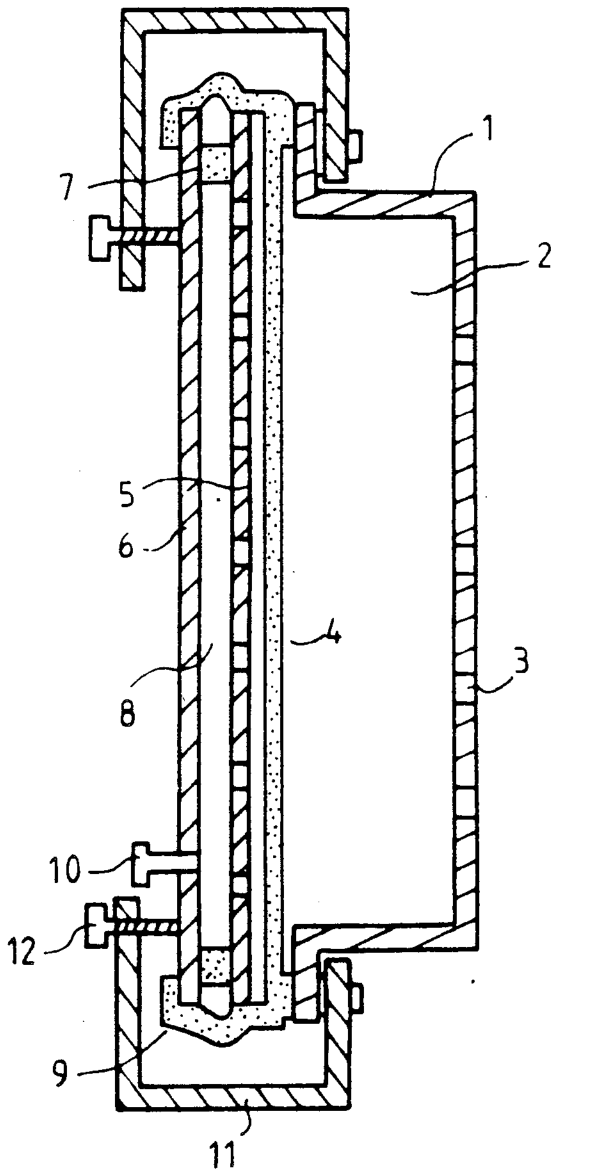
FIG. 1 shows a sectional view of a reflector according to the invention.

The reflector shown in a sectional view in FIG. 1 has a cover 1 that acts as a support for all the other elements of the device and demarcates a first internal cavity 2 communicating with the exterior by means of a set of holes 3 enabling the entry and exit of water when the reflector is submerged.

The cavity 2 is closed by a highly flexible rubber membrane 4 which presses against the shoulders of the cover on its periphery.

A perforated separation plate 5 is located above the membrane 4 and itself also presses on the shoulders of the cover through this membrane.

A plate 6, called a reflective plate, having the same dimensions as the plate 5, is fixed to it by rubber pads 7 evenly distributed on the periphery of these two plates so as a demarcate a sheet of air 8 between these two plates. It is the interface between this reflecting plate and the sheet of air that acts as a reflector owing to the break in acoustic impedance at this level: this justifies the qualifying term "reflecting" applied to said plate.

A rubber band 9 enables imperviousness to be maintained between the plate 7 and the membrane 4 so as to demarcate a second inflatable cavity formed by the sheet of air 8 and the space located between the membrane 4 and the perforated plate 5. This space is virtual in the figure which shows the device before inflation. This rubber band 9 may be a fold of the membrane 4, or a separate element which, in this case, will be clamped between the membrane 4 and the shoulder of the cover 1.

An inflating valve 10 is fixed to the reflecting plate 6 so that a gas such as air can be injected into the second cavity.

A U-shaped gutter 11 surrounds the periphery of the device so as to enclose the different elements in resting, by one side, on the exterior of the shoulder of the cover 1, to which it is affixed by any fixing means such as screws. By the other side, this gutter 11 holds the reflecting plate 6 still by means of adjustable screws 17 distributed all around said gutter. Thus, in the idle state shown in FIG. 1, the screws, in being supported on the reflecting plate, clamp the membrane 4 and the band 9 between the perforated plate 5 and the shoulder of the cover.

In being held still in this way, the system runs no risk of being disassembled under the effect of manipulations and shocks.

Before the device is used, it has to be put into a state of operation and, to this end, the second cavity must be inflated by means of the valve 10. This operation is done at the surface before submersion and, under these conditions, the membrane 4 spreads out in changing shape so as to fill the first cavity in pressing on the perforated internal face of the cover 1. The device is then in the state shown in FIG. *2a*.

For example the reflector can be inflated with an excess pressure of 0.3 bars above atmospheric pressure, and it will easily be understood that, under an excess pressure as moderate as this, the rubber band 9 runs no risk of snapping, even if it is relatively thin.

When the reflector is thus ready, it can be submerged in the sea, either by itself or with an apparatus to which it is fixed.

During the dive, the effect of the pressure due to the submersion causes water to penetrate the interior of the first cavity through the perforations 3 and compresses the membrane 4 which retracts and is thus gradually pushed back towards the perforated plate 5. In the same way, under the effect of the pressure which is exerted also on the reflecting plate 6, the rubber pads 7 get slightly crushed and this plate approaches the perforated plate 4 slightly in moving away from the screws 12.

By working on the stiffness of the rubber forming the pads 7, as well as on their number, it is possible to achieve a result wherein the mutual approaching of the two plates and the correlative reduction in the thickness of the sheet of air 8 are very small, while the membrane 4 retracts far more swiftly towards the perforated plate 5. Thus, the same result is obtained as would be the case if the two plates formed a rigid container supplied by a container with variable volume formed by the perforated plate 5 and the membrane 4.

Under these conditions, and up to a limit which shall be specified further below, the variation in the thickness of the sheet of air 8 may be considered to be insignificant throughout the range of use, in terms of submersion depth, of the reflector. Of course, the respective volumes of the two parts of the second cavity should be such that the volume formed by the sheet of air is appreciably smaller than the volume formed by the membrane, so that the variation in volume determined by the motion of the membrane may feed the volume determined by the sheet of air without any problem. To this end, it is possible to choose a relatively small thickness for this sheet of air, of the order of some millimeters, 1 to 2 mm for example.

Indeed, even if the motion of the reflective plate 6 under the effect of the pressure is low, it suffices to detach it from the screws 12. Under these conditions, this plate becomes mechanically free because, even if the rubber pads 7 are stiffer than the membrane 4, they are nevertheless flexible enough to mechanically detach the reflecting plate 6 from the perforated plate 5 and from the entire structure of the reflector.

Thus, since this plate is mechanically free, it no longer hinders the passage of the acoustic waves, at least for relatively low frequencies in underwater acoustics which, for example, may go up to 10 kHz for an 8 mm thick aluminum plate.

Under these conditions, the break in acoustic impedance between the reflecting plate and the sheet of air is such that a very great part of the acoustic waves is reflected by the device at this interface. Given the above-mentioned orders of magnitude, the thickness of the above-described sheet of air, which is of the order of 1 to 2 mm, is quite sufficient to enable this reflection, and the variation in this thickness under the effect of the pressure, which may be limited to some tens of mm, does not affect the performance characteristics of the reflector.

Figure 2A:
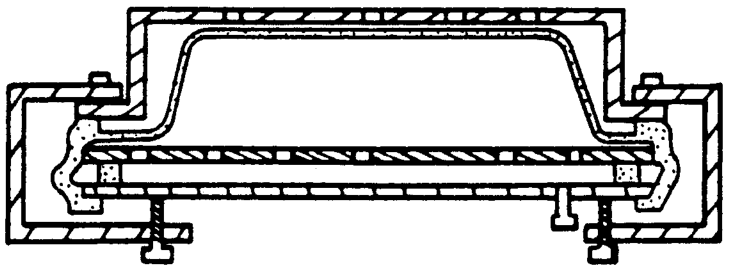
Figure 2B:
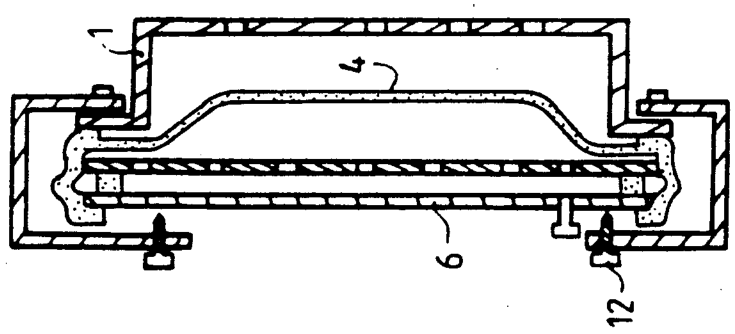

The conformation of the reflector throughout its range of use is similar to that shown in FIG. 2*b*, where there is a clear view of the strip 6 which has got detached from the screws 12 and the membrane 4 which is in an intermediate position within the first cavity demarcated by the cover 1. This configuration is set up swiftly starting from a point corresponding to a relatively low depth of submersion enabling pressure of the order of some bars, for example 3 bars, to be obtained.

Figure 2C:
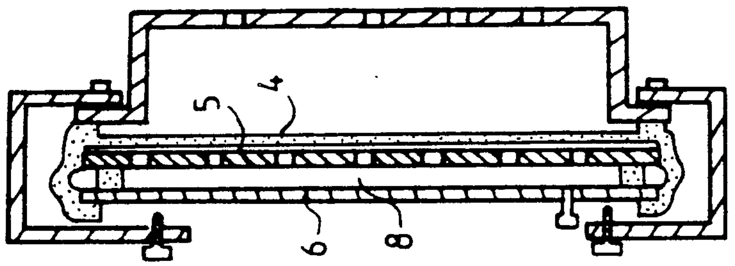

This limit is obtained when, as shown in FIG. 2*c*, the membrane 4 finally gets pressed flat against the perforated plate 5, all the air being finally contained between the plates 5 and 6 in the sheet of air 8.

Figure 2D:
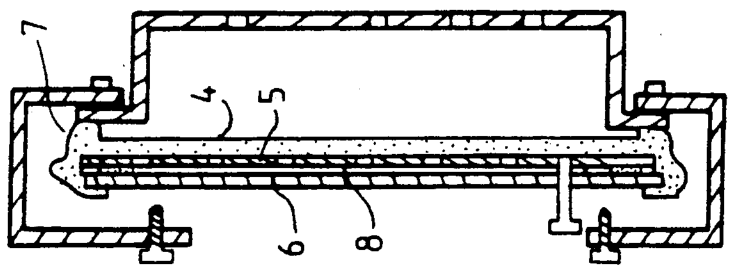

From this instant onwards, if the reflector is submerged further below, the forces get concentrated on the system formed by the perforated plate 5 plugged by the membrane 4 and the reflecting plate 6 separated from the plate 5 by the pads 7. Since the stiffness of the rubber pads is just appreciably greater than that of the membrane, which itself is very low, it is these pads that are crushed under the effect of the pressure, while the plates 5 and 6 do not change shape. Thus the space between these plates gets reduced and the thickness of the sheet of air 8 gets diminished. Under these conditions, although the device still works as a reflector beyond this limit depth of submersion, its performance characteristics swiftly deteriorate owing, firstly, to the reduction in the thickness of the sheet of air and, secondly, to the crushing of the rubber pads which no longer provide for the sufficient detachment of the two plates from each other. We then arrive at the configuration shown in FIG. 2*d* where the reflector no longer works satisfactorily.

Figure 3:
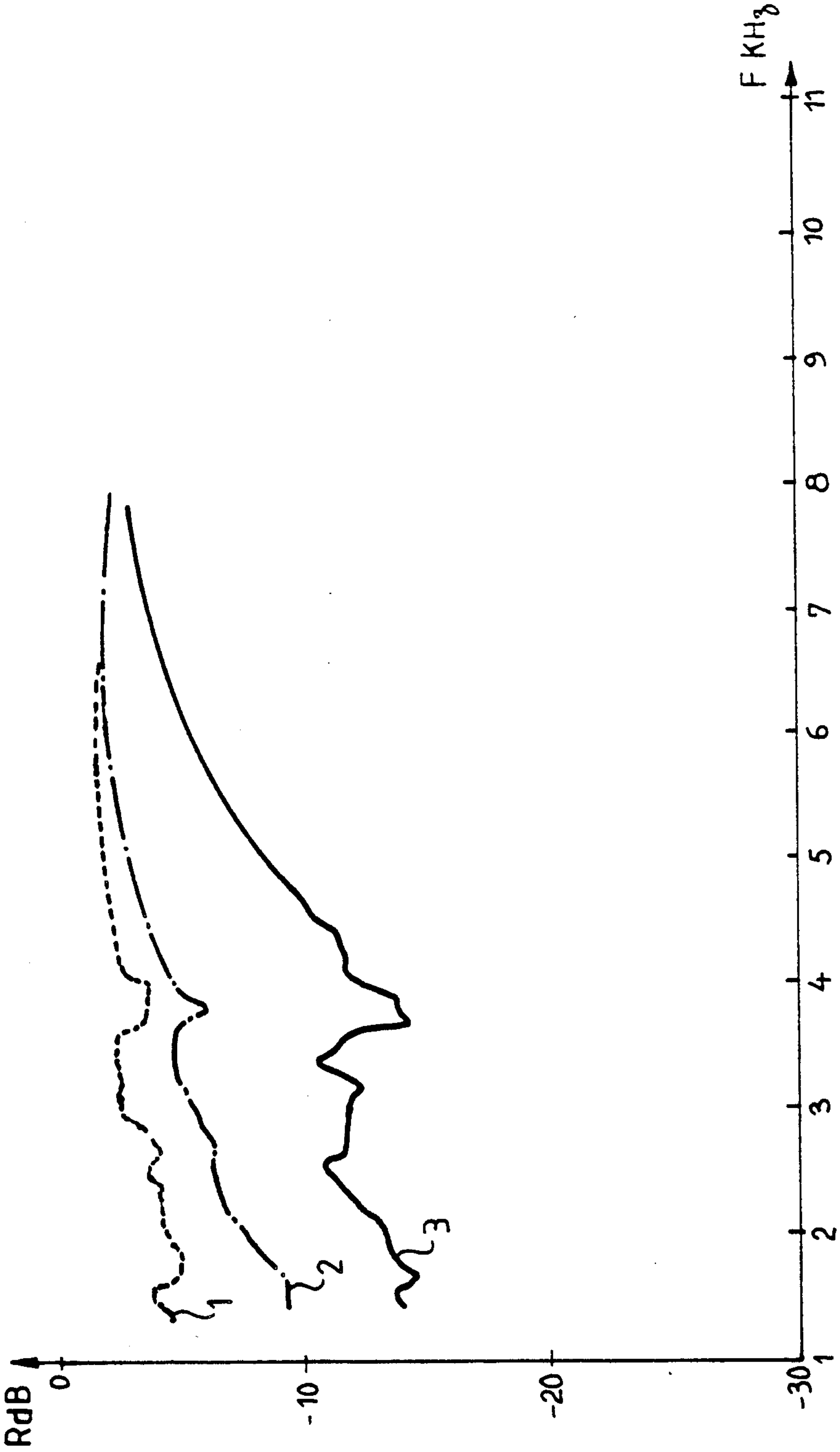
FIG. 3 shows a curve of variations of the coefficient of reflection as a function of frequency.

The experimental results shown in FIG. 3 were obtained with an acoustic reflector having the above-described parameters and dimensions of 1 m×1 m with an overall thickness of 10 cm. In this figure, the frequency, given on the x-axis, is expressed in kHz and the coefficient of reflection R, on the y-xis, is expressed in decibels. The curves 1, 2 and 3, correspond respectively to pressures equal to 10, 40 and 45 bars. Given the results obtained with the other prior art reflectors, notably those using foam, these results are highly satisfactory and show that such a reflector can be used up to a submersion depth of 450 m, corresponding to a pressure of 45 bars, with satisfactory performance characteristics being obtained in a range of frequencies from 4 to 8 kHz. Another mechanical choice of dimensions may similarly provide for greater resistance to pressure.

What is claimed is:

1. An acoustic wave reflector capable of working under deep submersion, that includes a reflecting plate, a perforated plate, means to keep the reflecting plate parallel to the perforated plate, without joining them acoustically to each other, and to demarcate a sheet of air between these plates, forming an acoustic reflector with the reflecting plate, means to maintain the imperviousness between the two plates on their periphery, and a flexible membrane fixed to the periphery of the perforated plate on the other side from the reflecting plate to form an inflatable cavity communicating with the sheet of air, the stiffness of the means to keep the two plates parallel to each other, as compared with the stiffness of the flexible membrane, being such that, under the external pressure of submersion, the inflatable cavity gets retracted by pushing the air towards the sheet of air without any substantial reduction in the thickness of this sheet of air.

2. A reflector according to claim 1, further including means to inflate the sheet of air and the inflatable cavity at an initial excess pressure.

3. A reflector according to claim 2, further including a cover fixed to the periphery of the perforated plate and demarcating an internal cavity in which the flexible membrane spreads out to form said inflatable cavity, this cover being provided with perforations enabling water to be let in to push the membrane back towards the perforated plate.

4. A reflector according to claim 3, further including a U-shaped gutter that surrounds the periphery of a two plates and of the shoulder of the cover, this gutter being provided on its shoulder located on the other side of the cover with a set of stops enabling the movable parts of the reflector to be held in position before it is submerged.

5. A reflector according to claim 4, wherein the means to keep the reflecting plate parallel to the perforated plate is formed by rubber pads.

* * * * *